United States Patent
Saarikko

(10) Patent No.: US 6,570,987 B1
(45) Date of Patent: May 27, 2003

(54) TELEPHONE AND ITS HOLDER

(75) Inventor: Anssi Saarikko, Salo (FI)

(73) Assignee: Nokia Mobile Phones Ltd., Salo (FI)

( * ) Notice: Subject to any disclaimer, the term of this patent is extended or adjusted under 35 U.S.C. 154(b) by 1202 days.

(21) Appl. No.: 08/661,220

(22) Filed: Jun. 10, 1996

(30) Foreign Application Priority Data

Jun. 30, 1995 (FI) .................................................. 953249

(51) Int. Cl.⁷ ................................................. H04Q 7/32
(52) U.S. Cl. .................. 379/428.01; 379/454; 379/455; 379/446; 455/550; 455/575; 455/572; 455/573
(58) Field of Search ................................ 379/454, 455, 379/446, 435, 436, 428; D14/149, 142, 138, 251; 455/89, 90, 575, 550, 462, 572, 573; 320/2, 5, 3

(56) References Cited

U.S. PATENT DOCUMENTS

| | | | |
|---|---|---|---|
| 4,670,701 A | 6/1987 | Sako et al. ...................... 320/2 |
| 5,065,082 A | * 11/1991 | Fushiya .......................... 320/2 |
| 5,189,632 A | 2/1993 | Paajanen et al. ....... 364/705.05 |
| 5,189,698 A | 2/1993 | Hakanen ....................... 379/455 |
| 5,200,997 A | 4/1993 | Leman ......................... 379/428 |
| 5,202,913 A | 4/1993 | Lang et al. .................... 379/58 |
| 5,214,309 A | 5/1993 | Saarnimo .................... 257/712 |
| 5,229,701 A | * 7/1993 | Leman et al. .................. 455/90 |
| 5,253,146 A | 10/1993 | Halttunen et al. .......... 361/784 |
| 5,265,158 A | 11/1993 | Tattari ........................ 379/433 |
| 5,271,056 A | 12/1993 | Pesola et al. ................. 379/58 |
| 5,347,208 A | * 9/1994 | Iida ............................. 455/90 |
| 5,361,459 A | 11/1994 | Hyvonen et al. .............. 24/35 |
| D361,069 S | * 8/1995 | Hellier et al. .............. D14/142 |
| 5,535,274 A | * 7/1996 | Braitberg et al. ........... 379/455 |

FOREIGN PATENT DOCUMENTS

JP 4020156 * 1/1992 ................. 379/428
WO WO 90/07833 7/1990

OTHER PUBLICATIONS

Patents Abstract of Japan, vol. 13, No. 568, E–861, abstract of JP, A, 1–236753 (Matsushita Electric Ind. Co. Ltd.), (Sep. 21, 1989).

* cited by examiner

Primary Examiner—William Trost
Assistant Examiner—Keith Ferguson
(74) Attorney, Agent, or Firm—Perman & Green, LLP

(57) ABSTRACT

The invention relates to a telephone and its desk top holder. The holder has three projections (7, 8) functioning as support points, and the lower end of the telephone has cavities correspond to them. A telephone placed in the holder will be kept in its place supported by the support points. Telephones of different forms can be placed in the same holder, provided that they have cavities corresponding to the projections of the holder.

8 Claims, 2 Drawing Sheets

TELEPHONE AND ITS HOLDER

FIELD OF THE INVENTION

The invention relates to a telephone and its holder, in which the telephone can be placed upright, e.g. on a table.

THE PRIOR ART

Mobile phones use a desk top holder, in which the telephone can placed upright. The holder is used particularly when the telephone is charged. To this end the holder includes contact connectors corresponding to those of the telephone, and a connecting cord to a power supply.

Present desk top holders have a cavity with a form according to the telephone and into which the telephone is placed. The telephones must be made with an identical form so that different telephones can be placed in the same holder, which limits design possibilities. Even the same telephone can use only a battery of a certain type for each holder. Alternatively a separate holder must be made for each model, which again increases the costs.

THE INSTANT INVENTION

General Description

Now we have invented a telephone and its holder according to claim 1. The other claims present preferred embodiments of the invention.

The holder according to the invention has three support points placed in a triangular pattern, and correspondingly the lower end of the telephone has three counterparts. When the telephone is placed in the holder the counterparts take their place on the support points preventing lateral movement or overturning of the telephone. Preferably the support points are projections or cavities, and the counterparts are cavities or projections which fit in the support points. Preferably the projections are in the holder, whereby they do not spoil the appearance of the telephone. The counterparts may be located in the telephone's body or in the battery attached to the body.

Regarding the design and the stability a very convenient construction is such in which the holder has one larger projection at the back edge of the bottom and two smaller peg-like projections centrally at the bottom sides.

According to the invention it is possible to manufacture holders which are suited for telephones of many sizes, provided that the lower end of the telephone has counterparts which catch the support points.

DRAWINGS

The enclosed drawings are a part of the detailed description of the invention. In the drawings.

Figure 3:
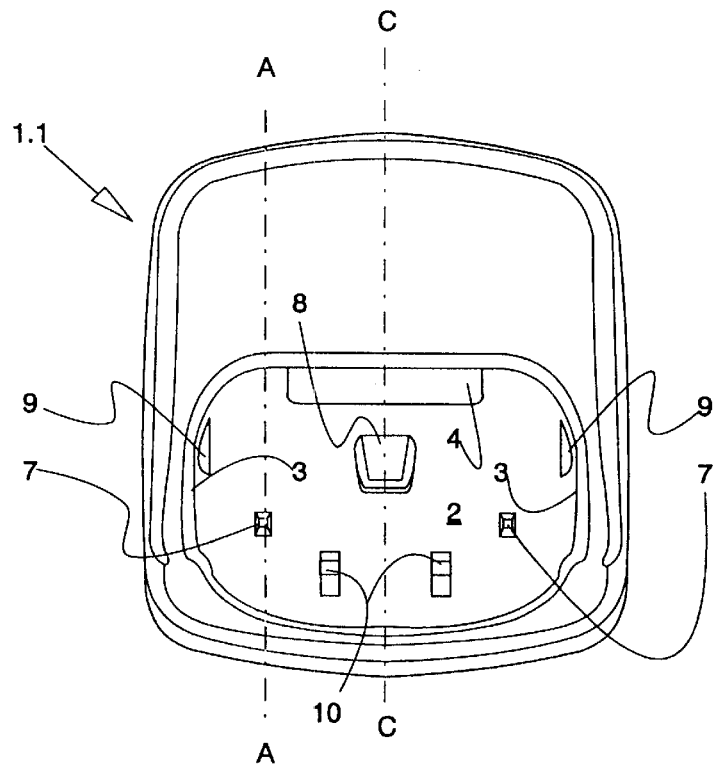
FIG. 3 shows another holder according to the invention.
Figure 3A:
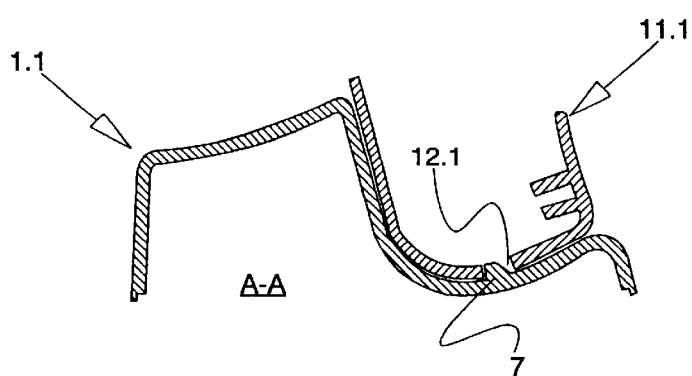

FIG. 3*a* shows the section A—A of FIG. 3; and

Figure 3B:
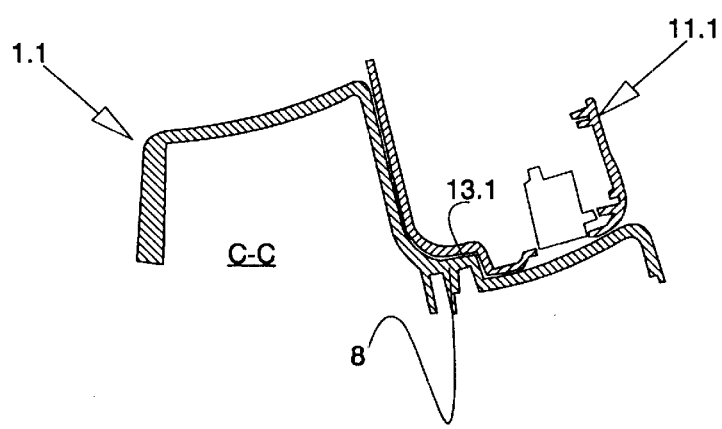

FIG. 3*b* shows the section C—C of FIG. 3.

DETAILED DESCRIPTION

Figure 1:
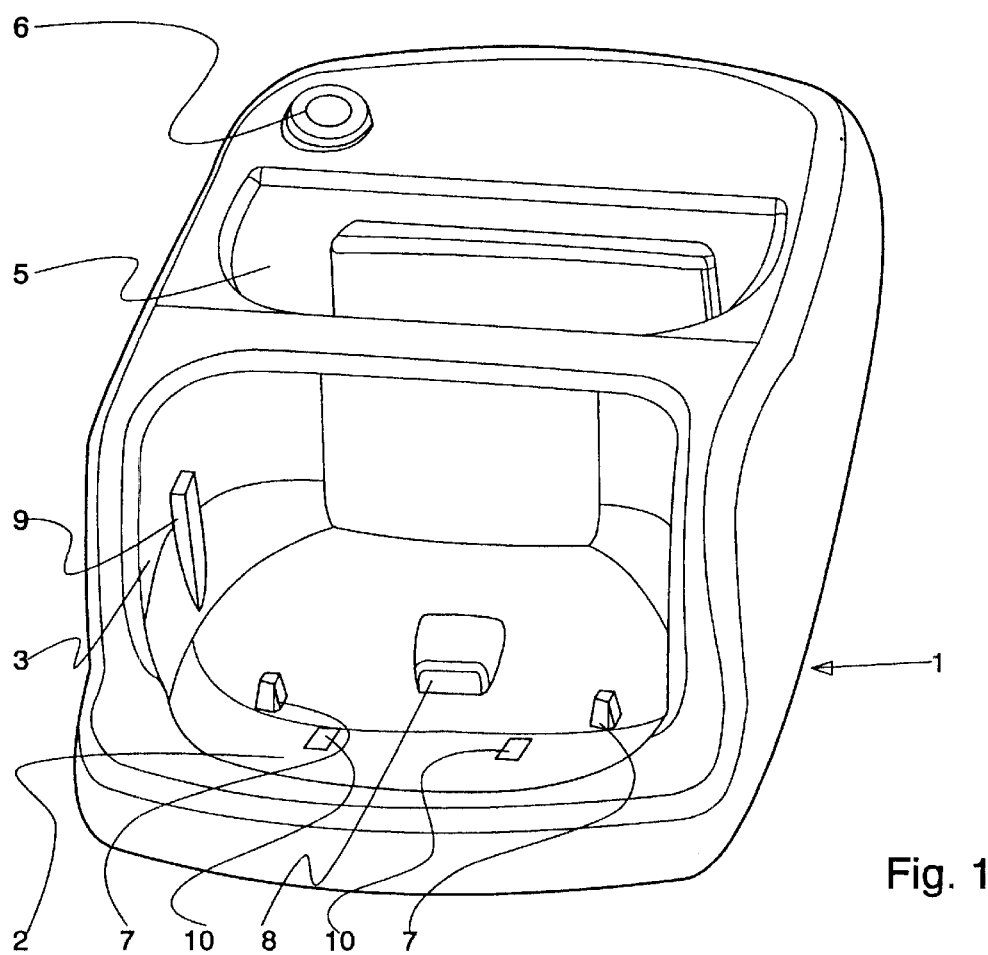
FIG. 1 shows a holder according to the invention.

The holder 1 according to FIG. 1 has in the front part a space for a telephone, the space being defined by the bottom 2, the side walls 3 and a backwards inclined back wall 4. The bottom and the side walls are slightly concave, but otherwise the front wall is open. The back of the holder holds a battery space 5 and a switch 6. The outer bottom of the holder is straight, so that the holder can be placed on a horizontal base, e.g. on a table.

In the center of the bottom sides there are upwards projecting support pegs 7. The pegs have a slightly conical form. In the center of the bottom back side there is a larger support projection 8. The support projection tapers slightly upwards and forwards. As seen in FIGS. 1 and 3, the two support pegs 7 are spaced apart from the walls 3, 4 and extend up from the bottom 2 in a general cantilevered fashion. The front two support pegs 7 are located proximate the open front wall.

The support pegs 7 and the support projection 8 form a three point support for a telephone placed in the holder. The lower end of the telephone has corresponding apertures. The apertures can be placed in the body of the telephone or in a replaceable battery attached to the body, for instance so that the body has apertures for the support pegs and the battery an aperture for the support projection. However, all apertures can also be in the battery or in the body, depending on the design of the parts.

Both side walls 3 have in addition vertical ribs 9. Telephones which extend to the ribs have corresponding grooves, which act as apertures. With the aid of the ribs also telephones equipped with different batteries can be better kept in the same position.

At the bottom 2 there are contact connectors 10, which correspond to the connectors in the lower end of the telephone.

Figure 2:
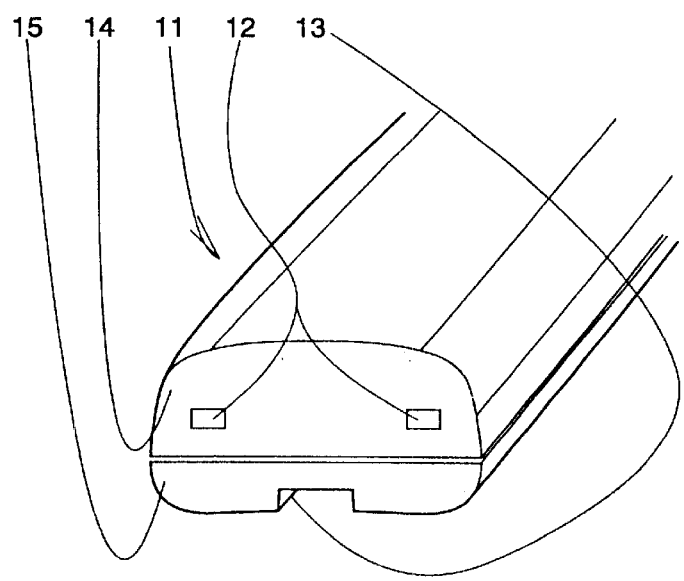
FIG. 2 shows the lower end of a telephone suitable for the holder.

FIG. 2 shows a telephone 11 having in the lower end apertures 12, which function as apertures for the pegs, and a in the back edge of the lower end a counterpart cavity 13, which functions as an aperture for the support projection. In this case the apertures 12 are in the telephone body 14 and the counterpart cavity is in the battery 15.

FIG. 3 shows a holder 1.1 corresponding to that of FIG. 1 but without a separate battery space. FIGS. 3*a* and 3*b* also show a telephone 11.1 placed in the holder, the telephone having counterpart apertures 12.1 and a counterpart cavity 13.1.

What is claimed is:

1. A telephone and its holder, whereby the telephone has a lower end and the holder contains a space, into which the telephone can be placed with the lower end against a bottom of the space, characterized in that the bottom having three support points placed mutually in a triangular pattern and the lower end of the telephone having three correspondingly placed counterparts, which are fixed to the support points so that lateral movement or overturning of the telephone is prevented when the telephone is placed against the bottom, wherein the support points are projections or cavities and correspondingly the counterparts are mating cavities or projections, a side wall joins the bottom, and that the side wall has a vertical rib or groove, and that the telephone has a side surface having a counterpart groove or rib, whereby the ribs and grooves fit into each other to support the telephone when it is placed against the bottom.

2. A telephone having a lower end and which can be placed in a holder having a bottom, characterized in that the lower end of the telephone has three counterpart cavities placed mutually in a triangular pattern, so that the telephone can be placed in a holder having on the bottom three correspondingly located projecting support points wherein the cavities are sized and shaped to receive the projecting support points therein for mounting the telephone on the holder; and that at least one of the counterpart cavities is in a battery attached to the telephone.

3. A telephone battery having a lower end and which can be placed from above into a holder having a bottom, characterized in that the lower end of the battery has at least one counterpart which, when the battery is mounted to a telephone, forms three counterparts placed mutually in a triangular pattern, so that the battery and the telephone attached to it can be placed in the holder having at the bottom three correspondingly located support points that mate with the three counterparts for stably mounting the battery and the telephone in the holder.

4. A telephone battery having a lower end and which can be placed from above into a holder having a bottom, characterized in that the lower end of the battery has at least one counterpart which, when the battery is mounted to a telephone, forms three counterparts placed mutually in a triangular pattern, so that the battery and the telephone attached to it can be placed in the holder having at the bottom three correspondingly located support points that mate with the three counterparts for stably mounting the battery and the telephone in the holder, wherein the holder further comprises electrical contacts separate from the three support points for contacting the telephone.

5. A telephone holder having a space, into which it is possible to place a telephone having a lower end, characterized in that the space has a bottom against which the lower end of a telephone is placed, the bottom having three support points placed mutually in a triangular pattern, so that a telephone can be placed against the bottom, the telephone having three correspondingly placed counterparts, wherein the support points and correspondingly placed counterparts comprise mating projections and cavities; and the holder further comprises electrical contacts separate from the three support points for contacting the telephone.

6. A telephone holder having a receiving space for receiving a portion of a telephone, the space having a bottom, a rear wall, side walls and an open front wall, the holder further comprising three support points extending upward from the bottom in a triangular pattern with two of the support points being spaced from walls.

7. A telephone holder according to claim 6 wherein the two support points are located proximate the open front wall.

8. A telephone holder according to claim 7 wherein a third one of the support points is located proximate the rear wall, the third support point tapering upwards and forwards.

\* \* \* \* \*